(12) United States Patent
Ohshiro

(10) Patent No.: US 6,998,076 B2
(45) Date of Patent: Feb. 14, 2006

(54) INJECTION COMPRESSION MOLDING METHOD AND MACHINE FOR CARRYING OUT THE SAME

(75) Inventor: Takeo Ohshiro, Numazu (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 386 days.

(21) Appl. No.: 10/327,694

(22) Filed: Dec. 24, 2002

(65) Prior Publication Data

US 2003/0151166 A1    Aug. 14, 2003

(30) Foreign Application Priority Data

Dec. 26, 2001  (JP)  ............................. 2001-394101

(51) Int. Cl.
    *B29C 45/64*    (2006.01)
(52) U.S. Cl. ................. 264/40.5; 264/328.7; 425/149; 425/150; 700/203
(58) Field of Classification Search ............... 264/40.5, 264/328.7, 2.2, 328.12; 425/555, 155, 162, 425/149, 150, 156; 700/200, 203
    See application file for complete search history.

(56) References Cited

U.S. PATENT DOCUMENTS

| | | | | |
|---|---|---|---|---|
| 5,705,105 A | * | 1/1998 | Inoue | ......................... 264/2.2 |
| 6,331,263 B1 | * | 12/2001 | Abe et al. | .................. 264/40.5 |
| 6,716,374 B1 | * | 4/2004 | Yutani et al. | ............... 264/1.33 |
| 6,814,908 B1 | * | 11/2004 | Marazita | ..................... 264/40.5 |
| 6,840,618 B1 | * | 1/2005 | Pope | .......................... 351/159 |

* cited by examiner

Primary Examiner—Jill L. Heitbrink
(74) Attorney, Agent, or Firm—Pillsbury Winthrop Shaw Pittman, LLP

(57) ABSTRACT

A method of this invention is an injection compression molding method of molding a thin molding, using an injection compression molding machine including: a pair of a movable mold and a stationary mold defining a molding space; a movable die plate on which the movable mold is mounted; a stationary die plate on which the stationary mold is mounted; an injection unit for injecting a molding material into the molding space; and a mold clamping unit for causing the movable die plate to move toward and away from the stationary die plate, capable of controlling a clamping pressure for pressing the movable die plate toward the stationary die plate while the injection unit is injecting the molding material into the molding space. This method includes a nonloaded flow step of controlling the mold clamping unit in such a manner that any resistance is not exerted substantially against flow of the molding material injected into the molding space by the injection unit, during the injecting step. In addition, this method includes a preliminary clamping step of controlling the mold clamping unit in such a manner that a predetermined preliminary pressure is applied to the molding material that has been injected into the molding space by the injection unit, during the injecting step.

7 Claims, 3 Drawing Sheets

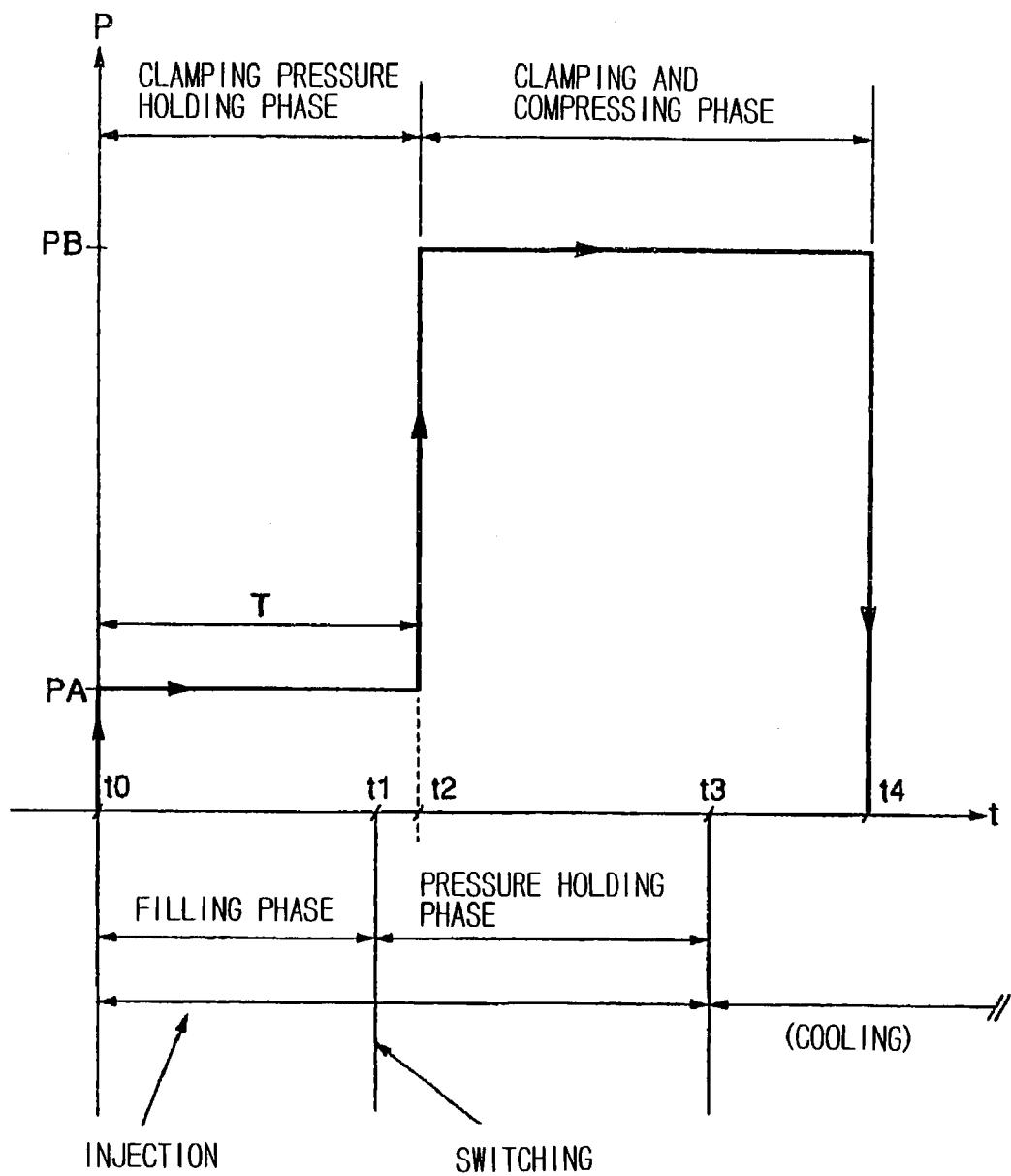
F I G. 3

INJECTION COMPRESSION MOLDING METHOD AND MACHINE FOR CARRYING OUT THE SAME

TECHNICAL FIELD

The present invention relates to an injection compression molding method of forming a thin disk-shaped substrate as a thin molding by an injection molding machine, and a machine for carrying out the same.

BACKGROUND ART

In forming a thin disk-shaped substrate, such as a CD or a DVD, by an injection molding machine, only a small quantity of a molten resin and only a short molding cycle time of several seconds are used for forming one disk, because the disk is thin. A large quantity of digital information is transferred from a stamper to the disk under such a severe condition.

In forming an optical molding, such as a thin disk-shaped substrate, by injection molding using a resin, internal strain is liable to be generated because of molecular orientation in the resin when the resin is injected into a die to fill up a cavity. Consequently, birefringence and warpage angle (camber angle) are liable to increase. Therefore, the mold is clamped by a low mold clamping force during a filling step to suppress the internal strain that may be caused during the filling step. Generally, an injection compression circuit is used to increase the mold clamping force at the completion of the filling step, or before and/or after the completion of the filling step, and to ensure the formation of recording pits.

An injection compression molding method of forming a thin disk-shaped substrate holds a low mold clamping pressure during an injection and filling step. Therefore, the pressure of a molten resin filled in the mold opens the mold and, consequently, the thickness of a cavity corresponding to the thickness of a disk-shaped substrate increases. Thus, strain caused by a shearing stress induced in the surfaces of a disk-shaped substrate being molded can be suppressed at a low level. The smaller the strain caused by the shearing stress, the smaller are the birefringence and the warp of the substrate, and hence warpage angle is reduced. However, an effort to reduce birefringence and warpage angle and an effort to form accurately recording pits conflict with each other.

FIG. 3 is a diagram showing an instruction waveform indicating levels of mold clamping pressure P for a clamping part, with respect to time t after starting an injection phase, in a conventional method of molding a thin disk-shaped substrate. In FIG. 3, operations (phases) to be carried out by an injection part are shown for reference under the horizontal axis on which the time t is measured. Generally, a mold clamping step to be carried out by the mold clamping part includes a clamping pressure holding phase and a clamping and compressing phase. In the clamping pressure holding phase, a molten resin is filled mainly into a cavity, i.e., a forming space, substantially in cooperation with the filling phase of the injection unit. In the clamping and compressing phase, the formation (transfer) of recording pits or the like is achieved mainly, substantially in cooperation with a pressure holding phase by the injection unit.

As show in FIG. 3, a comparatively low clamping pressure PA is held for a term T in the conventional clamping pressure holding phase. Subsequently, after a time t2, a comparatively high clamping pressure PB is held while the transfer operation is carried out. The clamping and compressing phase is terminated at a time t4 during a cooling phase.

As apparent from the foregoing description, a single level of clamping pressure is held in the conventional clamping pressure holding phase. Therefore, it is difficult to mold a substrate satisfying all the requirements, i.e., a desired degree of birefringence, a desired degree of warpage angle and a desired transfer characteristic. More concretely, although birefringence and warpage angle may be satisfactorily reduced when the clamping pressure is set comparatively low, a desired transfer characteristic cannot be achieved. On the other hand, although a transfer characteristic is satisfactory when the clamping pressure is set comparatively high, birefringence and warpage angle are excessively large.

DISCLOSURE OF THE INVENTION

The inventors of the present invention examined the foregoing problems earnestly and found that the foregoing problems can be solved by controlling the clamping pressure holding phase in multiple stages.

Accordingly, it is an object of the present invention to provide an injection compression molding method of forming a thin molding causing a small birefringence, having a small warpage angle and insuring satisfactory formation of recording pits or the like, by controlling a clamping pressure during an injection and filling step lowly and in multiple stages, and to provide an injection compression molding machine for carrying out the injection compression molding method.

This invention is an injection compression molding method of molding a thin molding, using an injection compression molding machine including: a pair of a movable mold and a stationary mold defining a molding space; a movable die plate on which the movable mold is mounted; a stationary die plate on which the stationary mold is mounted; an injection unit for injecting a molding material into the molding space; and a mold clamping unit for causing the movable die plate to move toward and away from the stationary die plate, capable of controlling a clamping pressure for pressing the movable die plate toward the stationary die plate while the injection unit is injecting the molding material into the molding space; said method comprising: a molding space forming step of forming the molding space by joining together the movable mold and the stationary mold; an injecting step of injecting the molding material into the molding space by the injection unit; a nonloaded flow step of controlling the mold clamping unit in such a manner that any resistance is not exerted substantially against flow of the molding material injected into the molding space by the injection unit, during the injecting step; a preliminary clamping step of controlling the mold clamping unit in such a manner that a predetermined preliminary clamping pressure is applied to the molding material that has been injected into the molding space by the injection unit, during the injecting step; and a transfer clamping step of controlling the mold clamping unit in such a manner that a predetermined transfer pressure is applied to the molding material that has been injected into the molding space by the injection unit to transfer a desired pattern of a thin molding, after the injecting step.

According to the present invention, a clamping pressure holding phase substantially corresponding to the injecting step comprises multiple steps including the nonloaded flow step wherein the molding material is flown (filled) in a nonloaded state. Therefore, birefringence and warpage angle can be reduced, and recording pits or the like can satisfactorily be formed (transferred).

Preferably, the nonloaded flow step, the preliminary clamping step and the transfer clamping step are continued for respective predetermined times. In the case, each passage of the respective predetermined times can be judged by a timer.

In addition, a loaded flow step of controlling the mold clamping unit in such a manner that a predetermined resistance is exerted against the flow of the molding material injected into the molding space by the injection unit may be executed, before the nonloaded flow step.

Alternatively, this invention is an injection compression molding machine comprising: a pair of a movable mold and a stationary mold defining a molding space; a movable die plate on which the movable mold is mounted; a stationary die plate on which the stationary mold is mounted; an injection unit for injecting a molding material into the molding space; a mold clamping unit for causing the movable die plate to move toward and away from the stationary die plate, capable of controlling a clamping pressure for pressing the movable die plate toward the stationary die plate while the injection unit is injecting the molding material into the molding space; a nonloaded flow control unit for controlling the mold clamping unit in such a manner that any resistance is not exerted substantially against flow of the molding material injected into the molding space by the injection unit, while the molding material is being injected; a preliminary clamping control unit for controlling the mold clamping unit in such a manner that a predetermined preliminary pressure is applied to the molding material that has been injected into the molding space by the injection unit, while the molding material is being injected; and a transfer clamping control unit for controlling the mold clamping unit in such a manner that a predetermined transfer pressure is applied to the molding material that has been injected into the molding space by the injection unit to transfer a desired pattern of a thin molding, after the molding material has been injected.

Preferably, a time-setting control circuit for causing the nonloaded flow control unit, the preliminary clamping control unit and the transfer clamping control unit to operate for respective predetermined times may be provided.

The foregoing control units may be merged into an integral controller.

BRIEF DESCRIPTION OF THE DRAWINGS

FIGS. 1A and 1B are diagrams each showing an instruction waveform indicating levels of mold clamping pressure for a multistage clamping pressure control in a clamping pressure holding phase (including a nonloaded flow step and a preliminary clamping step) and a clamping and compressing phase (including a transfer clamping step), in which FIG. 1A shows an instruction waveform for a case wherein a clamping pressure holding phase is controlled in a two-stage clamping pressure control mode in which the first step is a nonloaded flow step, and FIG. 1B shows an instruction waveform for a case wherein a clamping pressure holding phase is controlled in a four-stage clamping pressure control mode in which the second step is a nonloaded flow step;

FIG. 3 is a diagram showing an instruction waveform indicating levels of mold clamping pressure in a clamping pressure holding phase and a clamping and compression phase of a conventional injection compression molding method of molding a thin molding.

BEST MODE FOR CARRYING OUT THE INVENTION

Preferred embodiments of the present invention will be described with reference to the accompanying drawings.

Figure 1A:
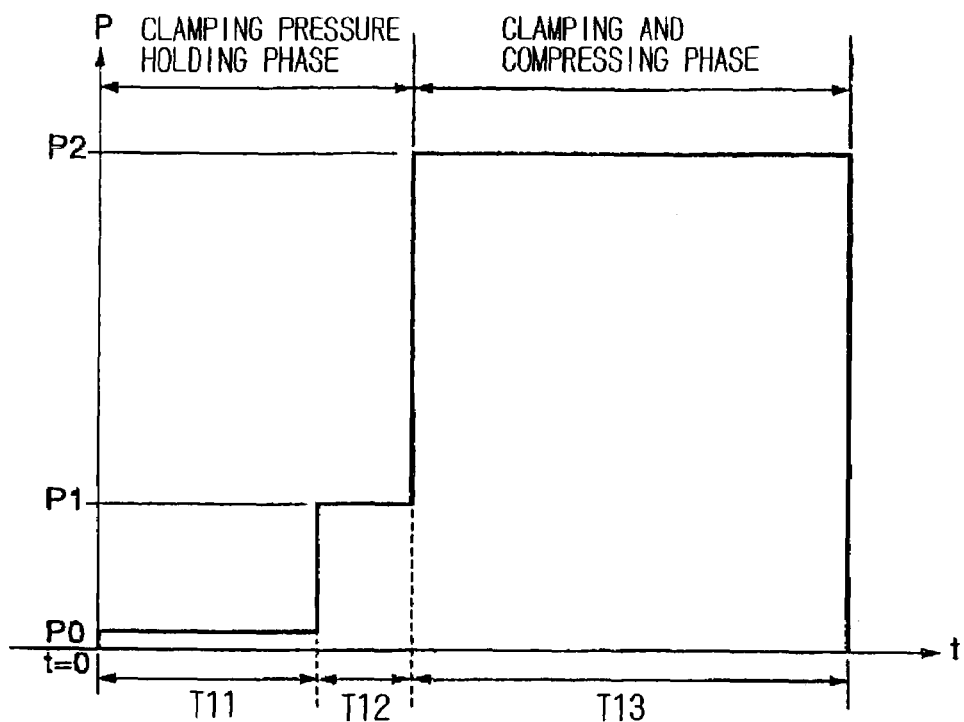
Figure 1B:
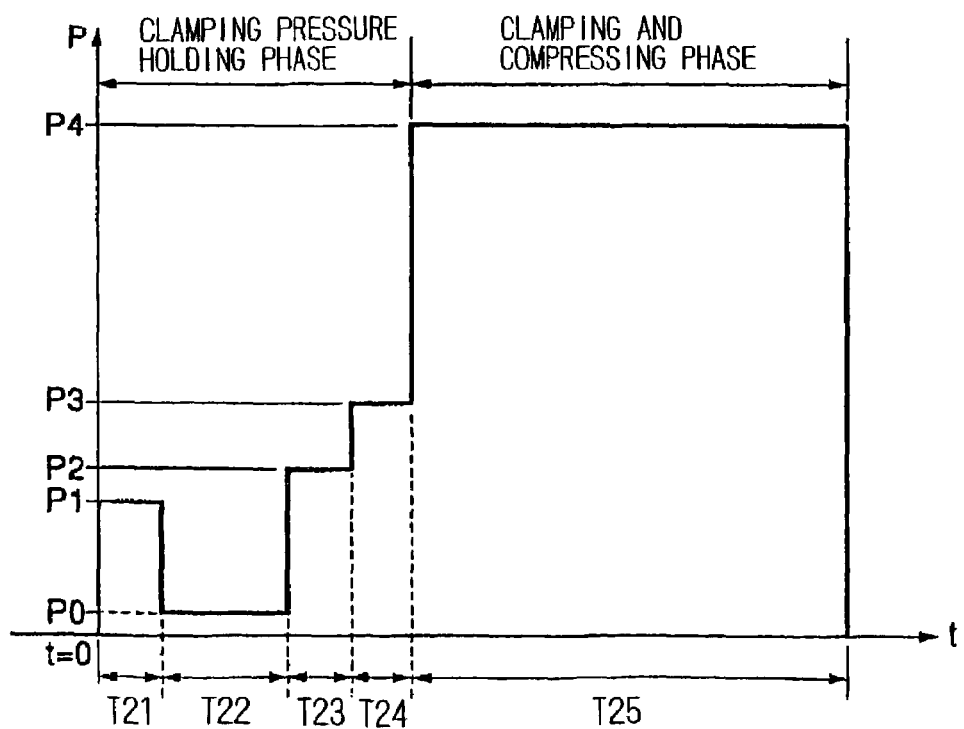

In FIGS. 1A and 1B, time elapsed after starting an injection step in a state wherein a pair of movable and stationary molds has been joined together is measured on the horizontal axis, and mold clamping pressure is measured on the vertical axis.

In the embodiment shown in FIG. 1A, the mold clamping pressure in a clamping pressure holding phase is controlled in a two-stage clamping pressure control mode. Herein, the mold clamping pressure is maintained at P0 for a term T11, and is maintained at P1 for a term T12 in the clamping pressure holding phase.

The mold clamping pressure P0 is very close to zero. A movable die plate is pushed backward by a molten resin injected into a cavity. A mold driving mechanism for opening and closing the mold and a mold clamping mechanism included in a mold clamping unit are kept in a nonloading state not to exert any resistance against the backward movement of movable die plate. The mold clamping pressure P0 corresponds to inertial resistance and resistance of sliding parts when the movable die plate moves backward. Thus, the molten resin is able to flow into and spread in the cavity in the term T11, while suppressing induction of shearing stress that causes birefringence and warpage to the least possible extent.

In the term T12 succeeding the term T11, a predetermined mold clamping pressure P1 is applied to the mold at a preparatory stage for forming recording pits or the like by transfer in the clamping and compressing phase. Then, a clamping pressure holding phase of an injection unit is changed to a clamping and compressing phase. A mold clamping pressure P2 is applied to the mold for a term T13 to carry out a transfer operation.

In the embodiment shown in FIG. 1B, the mold clamping pressure is controlled in a four-stage clamping pressure control mode. Herein, the mold clamping pressure is maintained at P0, which corresponds to the nonloading state for a term T22, after a term T21 has elapsed since the start of injection, instead of immediately after the start of injection. Terms T11, T12, T13, T21, T22, T23, T24 and T25 indicated in FIGS. 1A and 1B are set beforehand in a mold clamping controller, and a timer circuit measures those times.

Figure 2:
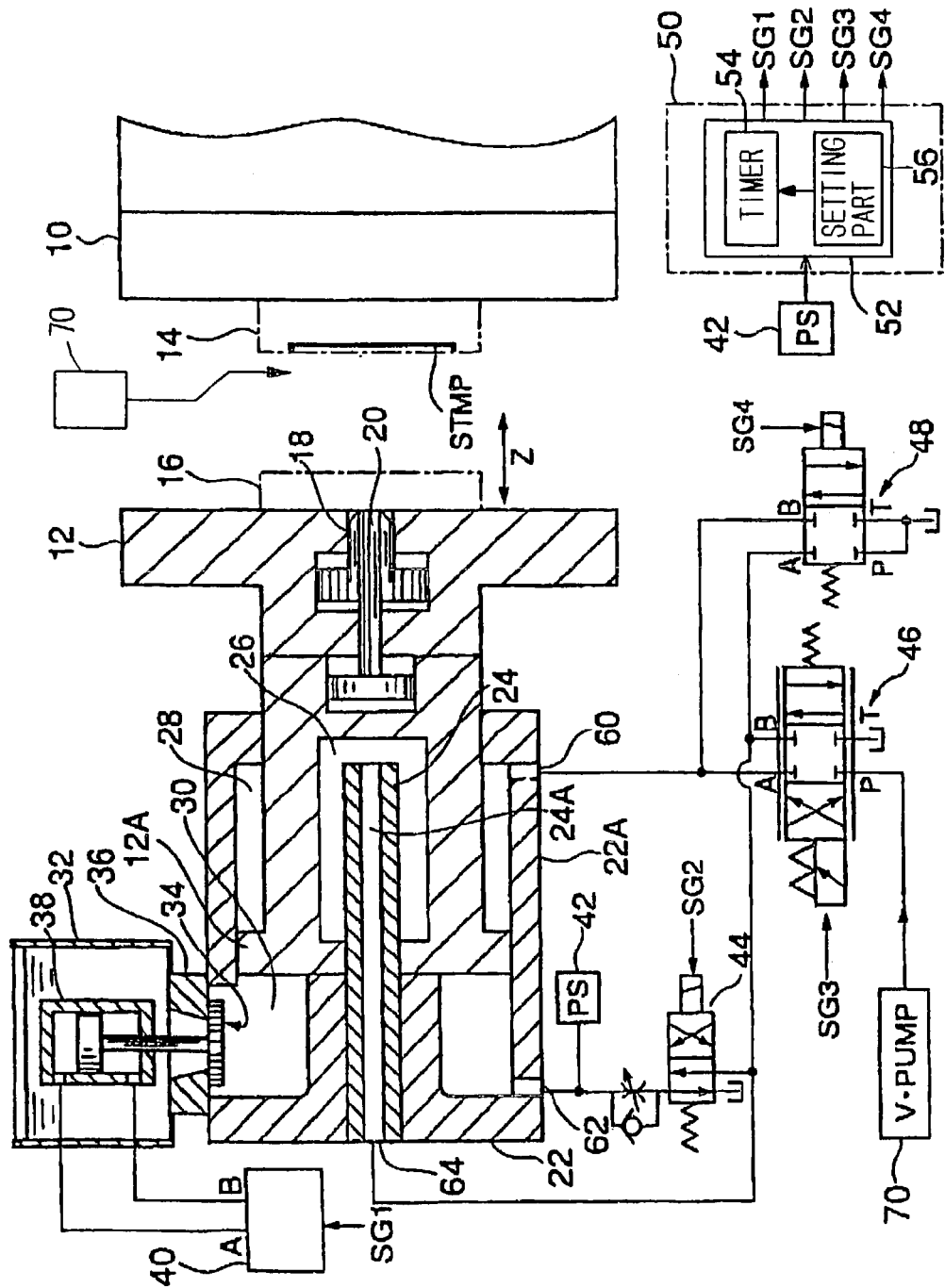
FIG. 2 is diagrammatic view of an essential part of an injection compression molding machine for carrying out an injection compression molding method of molding a thin molding according to the present invention.

FIG. 2 shows an essential part of an injection molding unit that carries out the multi-stage clamping pressure control modes in the clamping pressure holding phases mentioned above in connection with FIGS. 1A and 1B. In FIG. 2, indicated at 10 is a stationary die plate mounted on a base, not shown, included in an injection molding machine. A stationary mold 14 is attached to the left end surface of the stationary die plate 10. Indicated at STMP is a stamper, i.e., an original transfer plate. Indicated at 12 is a movable die plate. A movable mold 16 is attached to the right end surface of the movable die plate 12. A punch 18 for punching a hole in a central part of a molded disk is arranged in a central right part of the movable die plate 12. A piston for a hydraulic cylinder actuator is formed integrally with the punch 18 so as to extend to the left from the left end of the punch 18. An ejection rod 20 is extended through a central part of the punch 18. Another piston included in another hydraulic cylinder actuator is formed integrally with the ejection rod 20 so as to extend to the left from the ejection rod 20. Description of supply lines for supplying the pressure oil to the hydraulic cylinder actuators and selector valves and such placed in the supply lines will be omitted.

A mold clamping hydraulic cylinder actuator 22 is disposed on the left side of the movable die plate 12 and is mounted fixedly on the base of the injection molding machine. An outer part of the movable die plate 12 is inserted so as to be slidable in an outer cylinder 22A included in the mold clamping hydraulic cylinder actuator 22. A tubular member 24 defining a pressure oil passage 24A is fixedly fitted in a left central part of the mold clamping hydraulic cylinder actuator 22. The right end of the tubular member 24 opens into an oil chamber 26 formed in the movable die plate 12. The mold clamping hydraulic cylinder actuator 22 is provided with oil chambers 28 and 30. The oil chambers 28 and 30 are isolated from each other by a flange 12A formed at the left end of the movable die plate 12. The oil chamber 30 is formed for applying a mold clamping pressure to the movable die plate 12. The oil chamber 28 is formed for retracting the movable die plate 12, i.e., for moving the movable die plate 12 leftward in a direction indicated by an arrow Z in FIG. 2, when opening the mold.

Indicated at 32 is a tank fixedly mounted on a member 36 attached to an upper part of the mold clamping hydraulic cylinder actuator 22. A hydraulic cylinder actuator 38 provided with a piston rod is placed in the tank 32, and a valve element 34 is attached to the lower end of the piston rod. Communication between the oil chamber 30 and the tank 32 is controlled by controlling a gap between the upper surface of the valve element 34 and the lower surface of the member 36. Indicated at 40 is a selector valve unit. The selector valve unit 40 is controlled by a control signal SG1 provided by a mold-clamping-unit controlling part 52 included in an injection molding machine controller 50, to control supply of the pressure oil to the hydraulic cylinder actuator 38. Thus, the hydraulic cylinder actuator 38 operates the valve element 34 for opening and closing operations.

Indicated at 30 is a pressure sensor that measures the pressure in the oil chamber 30. Indicated at 44 is a two-way selector valve 44. The mold-clamping-unit controlling part 52 provides a control signal SG2 for controlling the two-way selector valve 44. Indicated at 46 is a servo valve. An outlet of a variable-displacement pump 70 is connected to a port P of the servo valve 46. A port A of the servo valve 46 is connected to a port 60 opening into the oil chamber 28. A port B of the servo valve 46 is connected to a port 64 formed in the tubular member 24 and to the two-way selector valve 44. The mold-clamping-unit controlling part 52 also provides a control signal SG3 for controlling the servo valve 46. Indicated at 48 is a two-way selector valve. The two-way selector valve 48 has ports P and T communicated to each other, a port A connected to the port B of the servo valve 46, and a port B connected to the port A of the servo valve 46. The mold-clamping-unit controlling part 52 also provides a control signal SG4 for controlling the two-way selector valve 48.

The mold-clamping-unit controlling part 52 of the injection molding machine controller 50 is provided with a timer circuit 54. The timer circuit 54 outputs desired control signals at the respective ends of the terms T11 to T25 shown in FIGS. 1A and 1B, each of the terms set by a setting part 56. In addition, an output signal of the pressure sensor 42 is given to the mold-clamping-unit controlling part 52, and the mold-clamping-unit controlling part 52 generates a clamping pressure control signal based on the output signal of the pressure sensor 42.

The operation of the injection compression molding machine shown in FIG. 2 will be described.

In FIG. 2, the movable die plate 12 is set at a left end position in the direction indicated by the arrow Z, i.e., a back end position, corresponding to a mold opening state. The mold driving mechanism is operated for a mold closing operation. In detail, the control signal SG1 is provided to supply the pressure oil to the port A of the selector valve unit 40. Consequently, the valve element 34 is moved down to connect the tank 32 to the oil chamber 30. In this state, the servo valve 46 is switched to the left position to supply the pressure oil through the port B of the servo valve 46, the port 64 and the passage 24A of the tubular member 24 into the oil chamber 26. Consequently, the movable die plate 12 is moved to the right. At the same time, the pressure oil in the oil chamber 28 is discharged from the port 60 through the port A of the servo valve 46, and is returned through a tank port T into the tank. The pressure oil is supplied from the tank 32 into the oil chamber 30 as the movable die plate 12 is moved to the right. The oil chambers 28, 26 and 30, the tubular member 24 defining the passage 24A, the valve element 34 and the servo valve 46 form the mold driving mechanism according to the present invention for opening and closing the mold. The oil chamber 30, the valve element 34, the two-way selector valve 44 and the servo valve 46 form the mold clamping mechanism according to the present invention.

Upon the completion of the mold closing operation, the movable mold 16 is joined to the stationary mold 14. Then, the mold-clamping-unit controlling part 52 provides the control signal SG1 to supply the pressure oil to the port B of the selector valve unit 40. Consequently, the valve element 34 is raised to disconnect the oil chamber 30 from the tank 32. At the same time, the mold-clamping-unit controlling part 52 provides the control signal SG2 to switch the two-way selector valve 44 from the left position to the right position. In addition, at the same time, the servo valve 46 is switched to a neutral position by the control signal SG3 from the mold-clamping-unit controlling part 52. In addition, the control signal SG4 switches the two-way selector valve 48 from the left position to the right position. In this state, the oil chambers 26 and 28 are connected through the ports A and B of the two-way selector valve 48 to a tank, not shown. The oil chamber 30 is also connected through the two-way selector valve 44 and the port A of the way-way selector valve 48 to the tank, not shown. Thus, the movable die plate 12 is in a nonloaded state.

Then, for example, the clamping pressure holding phase shown in FIG. 1A is started. The injection molding unit 70 starts an operation for injecting a molten resin into and filling the cavity with the molten resin. Then, the molten resin injected (flowing) into the cavity exerts a force on the movable die plate 12 to push the movable die plate 12 to the left, i.e., in the mold opening direction, whereby the oil in the oil chamber 30 is returned through the two-way selector valve 44 and the port A of the two-way selector valve 48 into the tank, not shown. The oil in the oil chamber 26 is forced to flow through the passage 24A and the port 64 toward the port A of the two-way selector valve 48. Since the oil chamber 28 is connected through the port B of the two-way selector valve 48 to the tank, not shown, the oil contained in the tank is supplied into the oil chamber 28.

This state is kept for the term T11. Upon the elapse of the term T1, the mold-clamping-unit controlling part 52 provides the signal SG4 to switch the two-way selector valve 48 from the right position to the left position shown in FIG. 2. The pressure oil pumped by a pump, not shown, is controlled by a solenoid relief valve, not shown, and is supplied through the two-way selector valve 44, a check valve and the port 62 into the oil chamber 30. At the same time, the pressure oil flows through the port 64 into the oil chamber 26.

The clamping pressure holding phase is terminated when the above state has been kept for the term T12, and then the clamping and compressing phase is started. The pressure of the pressure oil pumped by the pump, not shown, is adjusted to the mold clamping pressure P2 by a solenoid relief valve, not shown.

This state is kept for the term T13 to transfer a desired pattern to the surface of the disk.

Subsequently, the punch 18 is driven, and a mold opening instruction is outputted so that the valve element 34 is separated from the valve seat 36. In addition, the servo valve 46 is set to the right position, and the pressure oil is supplied through the port A of the servo valve 46 and the port 60 into the oil chamber 28. On the other hand, the oil is returned from the oil chamber 26 through the port 64 and the port B of the servo valve 46 into the tank.

The ejection rod 20 is driven during a mold opening operation or at the end of the same. Thus, a central part of the disk is separated from the disk as a molding. After the mold opening operation has been completed, the disk is removed from the movable mold 16 by a takeout device, not shown.

Operations for the clamping pressure holding phase shown in FIG. 1B are similar to those for the clamping pressure holding phase shown in FIG. 1A. That is, the valve element 34 is closed, and the two-way selector valve 44 is in the right position. In terms T21, T23, T24 and T25, the mold-claming-unit controlling part 52 provides respective control signals to set the two-way selector valve 48 in the left position. On the other hand, the mold-clamping-unit controlling part 52 provides a control signal to set the two-way selector valve 48 in the right position in a term T22 corresponding to the nonloaded state.

Although the injection compression molding machine shown in FIG. 2 has the hydraulic type of mold clamping unit including the mold driving mechanism and the mold clamping mechanism, the present invention is not limited thereto in its application. The present invention is applicable, for example, to an electric injection molding machine. When an electric injection molding machine is provided with a toggle mechanism, a servomotor for mold-clamping needs to be positively controlled so that the toggle mechanism may not hinder the nonloaded state.

Although the injection compression molding machine shown in FIG. 2 controls the mold clamping pressure in a multistage control mode in the clamping pressure holding phase, the mold clamping pressure in the clamping and compressing phase can be also controlled in a multistage control mode.

What is claimed is:

1. An injection compression molding method of molding a thin molding, comprising:

forming a molding space by joining together a movable mold and a stationary mold, said movable mold being mounted to a movable die plate and said stationary mold being mounted to a stationary die plate, said movable die plate being movable toward and away from the stationary die plate with a mold clamping unit, said mold clamping unit being configured to control a clamping pressure for pressing the movable die plate toward the stationary die plate while an injecting unit is injecting a molding material into the molding space;

injecting the molding material into the molding space by the injection unit;

controlling the mold clamping unit in such a manner that any resistance is not exerted substantially against flow of the molding material injected into the molding space by the injection unit, during the injecting;

controlling the mold clamping unit in such a manner that a predetermined preliminary pressure is applied to the molding material that has been injected into the molding space by the injection unit, during the injecting;

controlling the mold clamping unit in such a manner that a predetermined transfer pressure is applied to the molding material that has been injected into the molding space by the injection unit to transfer a desired pattern of a thin molding, after the injecting, and controlling the mold clamping unit in such a manner that a predetermined resistance is exerted against the flow of the molding material injected into the molding space by the injection unit before controlling the mold clamping unit in such a manner that any resistance is not exerted substantially against the flow of the molding material injected into the molding space by the injection unit.

2. An injection compression molding method according to claim 1, wherein the controlling of the mold clamping unit in such a manner that any resistance is not exerted substantially against the flow of the molding material, the controlling of the mold clamping unit in such a manner that a predetermined preliminary pressure is applied to the molding material, and the controlling of the mold clamping unit in such a manner that a predetermined transfer pressure is applied to the molding material are continued for respective predetermined times.

3. An injection compression molding method according to claim 1, comprising judging with a timer whether the respective predetermined times have elapsed.

4. An injection compression molding machine comprising:

a pair of a movable mold and a stationary mold defining a molding space;

a movable die plate on which the movable mold is mounted;

a stationary die plate on which the stationary mold is mounted;

an injection unit for injecting a molding material into the molding space;

a mold clamping unit for causing the movable die plate to move toward and away from the stationary die plate, capable of controlling a clamping pressure for pressing the movable die plate toward the stationary die plate while the injection unit is injecting the molding material into the molding space;

a nonloaded flow control unit for controlling the mold clamping unit in such a manner that any resistance is not exerted substantially against flow of the molding material injected into the molding space by the injection unit, while the molding material is being injected;

a preliminary clamping control unit for controlling the mold clamping unit in such a manner that a predetermined preliminary pressure is applied to the molding material that has been injected into the molding space by the injection unit, while the molding material is being injected; and a transfer clamping control unit for controlling the mold clamping unit in such a manner that a predetermined transfer pressure is applied to the molding material that has been injected into the molding space by the injection unit to transfer a desired pattern of a thin molding, after the molding material has been injected, wherein said injection compression molding machine is configured to control a predetermined resistance exerted against the flow of the molding material injected into the molding space by the injection unit before the nonloaded flow control unit controls the mold clamping unit in such a manner that any resistance is not exerted substantially against the flow of the molding material injected into the molding space by the injection unit, while the molding material is being injected.

5. An injection compression molding machine according to claim 4, further comprising a time-setting control circuit that causes the nonloaded flow control unit, the preliminary clamping control unit and the transfer clamping control unit to operate for respective predetermined times.

6. A controlling unit that controls an injection compression molding machine including a pair of a movable mold and a stationary mold defining a molding space; a movable die plate on which the movable mold is mounted; a stationary die plate on which the stationary mold is mounted; an injection unit for injecting a molding material into the molding space; and a mold clamping unit for causing the movable die plate to move toward and away from the stationary die plate, capable of controlling a clamping pressure for pressing the movable die plate toward the stationary die plate while the injection unit is injecting the molding material into the molding space; the controlling unit comprising:

a nonloaded flow control unit for controlling the mold clamping unit in such a manner that any resistance is not exerted substantially against flow of the molding material injected into the molding space by the injection unit, while the molding material is being injected;

a preliminary clamping control unit for controlling the mold clamping unit in such a manner that a predetermined preliminary pressure is applied to the molding material that has been injected into the molding space by the injection unit, while the molding material is being injected; and a transfer clamping control unit for controlling the mold clamping unit in such a manner that a predetermined transfer pressure is applied to the molding material that has been injected into the molding space by the injection unit to transfer a desired pattern of a thin molding, after the molding material has been injected, wherein said injection compression molding machine is configured to control a predetermined resistance exerted against the flow of the molding material injected into the molding space by the injection unit before the nonloaded flow control unit controls the mold clamping unit is controlled in such a manner that any resistance is not exerted substantially against the flow of the molding material injected into the molding space by the injection unit, while the molding material is being injected.

7. A controlling unit according to claim 6, further comprising a time-setting control circuit that causes the nonloaded flow control unit, the preliminary clamping control unit and the transfer clamping control unit to operate for respective predetermined times.

* * * * *